United States Patent [19]

Cromrich et al.

[11] Patent Number: 4,963,305

[45] Date of Patent: Oct. 16, 1990

[54] INSULATED FACE BRICK

[75] Inventors: John Cromrich; Lynn B. Cromrich, both of Clancy, Mont.

[73] Assignee: Leonard Bloom, Towson, Md.; a part interest

[21] Appl. No.: 335,482

[22] Filed: Apr. 10, 1989

Related U.S. Application Data

[60] Division of Ser. No. 733,576, May 13, 1985, Pat. No. 4,831,802, which is a continuation of Ser. No. 337,140, Jan. 5, 1982, abandoned.

[51] Int. Cl.[5] .............................................. C04B 41/81

[52] U.S. Cl. ........................................ 264/60; 264/43; 264/DIG. 63

[58] Field of Search ..................... 264/60, DIG. 63, 43

[56] References Cited

U.S. PATENT DOCUMENTS

| | | | |
|---|---|---|---|
| 772,476 | 10/1904 | Podmore | 52/311 |
| 1,704,193 | 5/1929 | Hoffman | 52/311 |
| 2,012,798 | 8/1935 | Wittier | 264/DIG. 63 |
| 2,079,664 | 5/1937 | Seigle | 52/612 |
| 2,868,008 | 1/1959 | Toulmin | 52/612 |
| 2,951,001 | 8/1960 | Rubenstein | 52/311 |
| 3,449,880 | 6/1969 | Bailey | 52/99 |
| 3,660,954 | 5/1972 | Logan | 52/311 |

FOREIGN PATENT DOCUMENTS

| | | | |
|---|---|---|---|
| 1306874 | 10/1962 | France | 52/311 |

*Primary Examiner*—James Derrington
*Attorney, Agent, or Firm*—Leonard Bloom

[57] ABSTRACT

A light weight, insulated facing brick is provided with a first outer layer formed from conventional bricking clay and a second insulative layer formed from a combination of clay and expanded vermiculite, which greatly increases the insulative qualities of the brick and also reduces its weight.

1 Claim, 1 Drawing Sheet

FIG 1
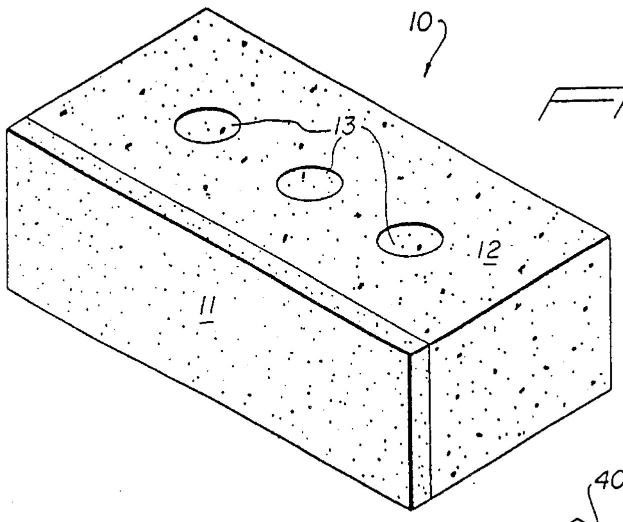
FIG 2
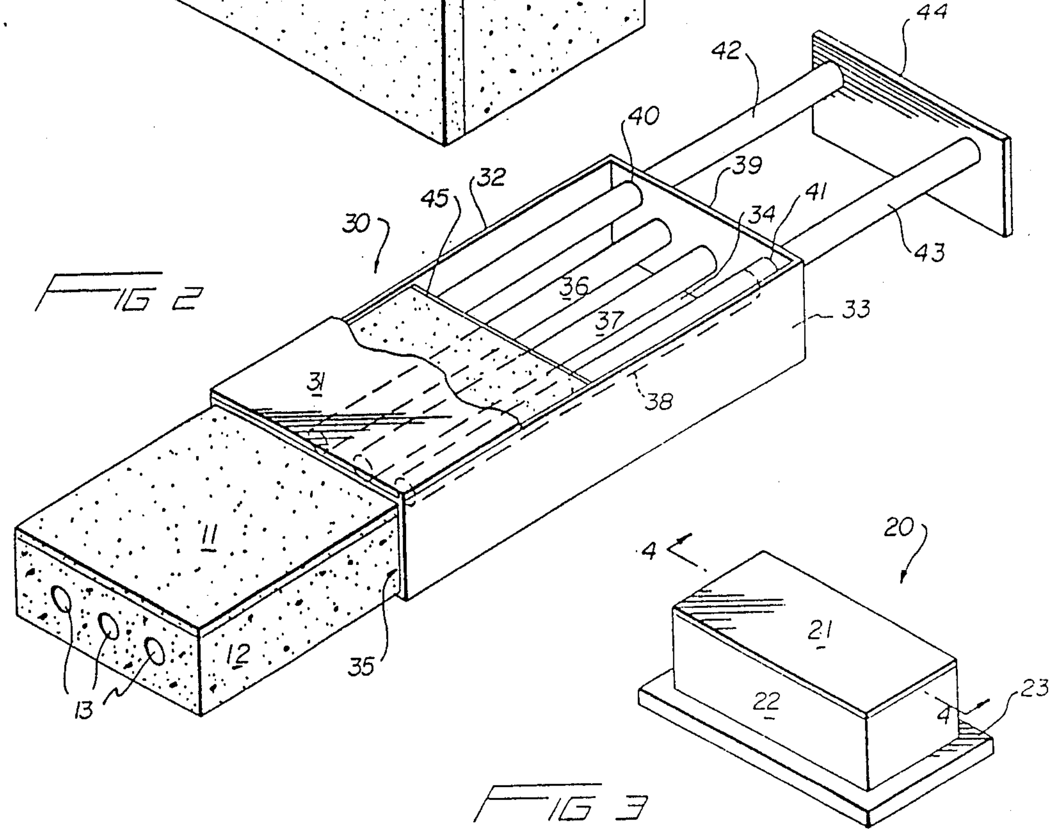
FIG 3
FIG 4
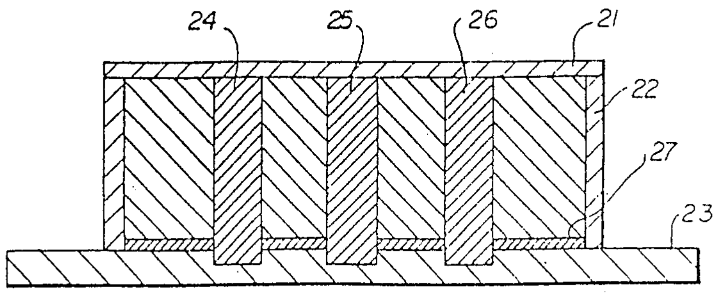

INSULATED FACE BRICK

This application is a division of application Ser. No. 733,576, filed May 13, 1985, now U.S. Pat. No. 4,831,802, which is a continuation of application Ser. No. 337,140, filed Jan. 5, 1982, now abandoned.

BACKGROUND OF THE INVENTION

The present invention relates generally to brick masonary and specifically to a facing brick that has superior insulation qualities.

The term brick masonary is properly applied only to that type of construction employing comparatively small building units made of burned clay or shale. Ordinary bricks are economical in cost and one of the most durable construction materials now in use. Bricks have been and continue to be one of the most important building blocks of a society. In fact, the archaeological excavator finds evidence that brick masonry can be traced back over six thousand years. Brick masonry has been and continues to be the basic unit with which civilization has been constructed.

Masonry bricks are classified as either building bricks or facing bricks. The building brick is load bearing and must have high compression strength, but appearance is no factor. In contrast, facing bricks are used on exposed surfaces where appearance is an important consideration. In fact, appearance is the criteria upon which facing bricks are graded. There are three different grades: 1. Type FBX-exposed interior/exterior, uniform size and color. 2. Type FBX-exposed interior/exterior, variation in size and color. 3. Type FBA-produced to result in non-uniformity in size, color, and texture.

Heretofore, bricks have only been graded according to strength and appearance, but this must change. As America becomes more and more energy conscious, no stone may be left unturned. Energy conservation must proceed with all due diligence in every field. Brick masonry does not provide good insulation in and of itself. Building trades have employed a layer of styrofoam insulation between the facing brick and the support wall. This practice involves extra footing space, extra cost of materials, extra labor, and limited means of fastening the veneer to the support wall. However, even though prior art brick is a poor insulator it is a superior facade material because of its ability to withstand the effects of weather, moisture, human neglect and abuse. Therefore, there exists a strong felt yet unfulfilled need for an invention according to the instant application, which provides a facing brick with superior insulation qualities, and thereby avoids economic waste.

The following patents reflect the state of the art of which applicant is aware insofar as they appear germane to the patent process:

3,847,633 Race
3,936,987 Calvin
4,056,910 Hiatt et al.
4,128,975 Abate
4,159,302 Greve et al.
4,191,528 Boggum et al.

Of these references, it would appear the the patent to Greve et al. is of interest since he teaches the use of a composition especially adapted to be formed as a core for a fire door that includes among its ingredients unexpanded vermiculite along with clay.

Similarly, the patent to Race teaches the use of a building material of modular construction in which one of the ingredients in a slurry is vermiculite. The molded slurry is then cured so as to produce a body having the desired density.

The patent to Boggum et al. teaches the use of forming a brick from a plurality of layers, and a technique for adjoining different layers having different properties. More particularly, the brick has an inner surface facing a glass melt, and an outer surface facing away from the melt, an upper portion and a lower base portion. The inner layer is formed from a material which is highly resistant to corrosion by the glass melt, and the central layer is formed from a material which is less resistant to corrosion and is joined to the inner layer. Thus a corrosive resistant tank block is designed to provide corrosive resistant material in those areas most subject to corrosion.

Calvin is of interest since he teaches the use of a concrete block formed with two large cores separated by a central web. The cores are adapted to receive insulating foam during the manufacturing of the block so as to provide support and insulation.

The remaining references further explore the state of the art.

The invention according to the instant application is distinguished over the prior art in that a single unit, conventional size spacing facing brick is formed in two layers one of which provides a conventional type durable facade, and the other of which is a mixture of materials that render superior insulative qualities. It would appear that the configuration of the instant invention is not anticipated by the prior art devices.

SUMMARY AND OBJECTS OF THE INVENTION

It is a primary object of the present invention to provide a novel facing brick which combines the superior durability of conventional facing bricks with the insulative qualities necessary to aid in the conservation of heating energy.

It is another object of the present invention to provide a novel facing brick which weighs less than a conventional brick and reduces noise levels better than the conventional facing bricks.

It is a further object of the present invention to provide a novel facing brick which can be struck, designed, colored, or patterned in any desired design.

Still another object of the present invention is to provide a novel facing brick which is significantly less weight than conventional bricks so that shipping costs and the construction costs of foundations and supports are reduced because of the less weight involved.

A further object of the present invention is to provide a novel facing brick which can be struck to conventional dimensions and provides sufficient insulative qualities so that the process of placing styrofoam between the facade and support walls can be eliminated entirely.

It is a still further object of the present invention to provide a novel facing brick the strength of which exceeds the building requirements for masonry veneer.

A still further object of the present invention is to provide a novel facing brick which is easy to produce and lends itself well to mass production techniques.

The objects stated above and other related objects are accomplished by the provision of a unique insulated facing brick with an outer or facade layer of conventional clay which is most durable and requires little maintainance, and a second insulative layer of clay and unexpanded vermiculite which reduces the weight of the brick while greatly increasing its insulative R value.

Other objects and advantages of the present invention will become apparent from the following description when taken in conjunction with the accompanying drawings.

BRIEF DESCRIPTION OF THE DRAWING FIGURES

FIG. 1 is a perspective view of a formed insulated facing brick.

FIG. 2 is a perspective view of an extrusion type mold in the process of producing a number of insulated facing bricks.

FIG. 3 is a perspective view of a mold for producing a single insulated facing brick.

FIG. 4 is a side sectional view along lines 4—4 of FIG. 3.

DESCRIPTION OF THE PREFERRED EMBODIMENT

Referring now to the drawings in detail, wherein like reference numeral represent like parts throughout the several figures, reference numeral 10 of FIG. 1 refers generally to the device according to the instant application.

The insulated brick 10 consists of two layers 11 and 12. The thin outer facing layer 11 is approximately one half inch thick and formed from the same type of clay used to make conventional type bricks. The thick insulative layer 12 is an admixture of clay and vermiculite which provides the insulative qualities. The brick 10 has three vertical one inch bores 13 which are centrally disposed, equal distance from one another, and pass completely through the insulative layer 12. These bores 13 help in uniform curing and burning of the brick.

The insulative layer 12 is formed by mixing clay in a powder form with dry vermiculite and then adding water after the two components have been throughly dry mixed. This avoids any adhesion problems and provides a mixture suitable for molding. The clay and vermiculite are dry mixed in a ratio of two parts expanded vermiculite to one part clay by volume, then 16% water is added and thoroughly mixed. The admixture is then molded as described below, and the facing layer 11 is applied to the appropriate face of the molded admixture. The brick 10 is then cured for six days at 70° F., after which the brick is fired at 1400° F. to 1800° F. for six hours until "burned" (a potter's term which is a point at which the fired clay will no longer change composition if moisture is added). The resultant brick is 10 is 25% lighter than a conventional brick, has four times the R value for heat retention, reduces noise, and has a comparable compression test rating for structural integrity.

The facing layer 11 can be molded separately or simultaneously with the insulative layer 12. The single brick mold is shown in FIGS. 3 and 4. The single brick mold generally referred to by reference numeral 20, has a top cover 21, a rectangular box mold 22 and a base plate 23, with three centrally disposed one inch diameter pipes 24, 25 and 26 which create the centrally disposed bores 13 in the molding process. The single brick mold 20 also has a push plate 27 which is used to remove the molded material from the mold itself. In molding a single brick 10, the clay layer 11 is either formed first and placed in the mold and then the vermiculite clay layer 12 is added to the mold and the covers placed onto to compress the materials or the facing layer 11 is applied after the insulative layer is molded. After the brick 10 has had time to set, it is removed from the mold by means of the push plate 27.

In an alternate embodiment, the bricks are molded by means of an extrusion type press generally referred to by reference numeral 30 (FIG. 2). The extrusion mold 30 is a rectangular box with a cover 31, two sides 32 and 33, a bottom 34, an open end 35, and an opposing end 39 which supports three horizontally disposed one inch diameter pipes 36, 37 and 38 which form the central bores 13 in this embodiment of the molding process. The end plate 39 has two apertures 40 and 41, which slidably receive the two ram rods 42 and 43. Fixed to the opposing ends of the ram rods 42 and 43 are two push plates 44 and 45 which when activated will extrude the brick material through the open end 35 of the mold 30.

In operation, push plate 45 is drawn back until it is flush with the end plate 39 and then the vermiculite and clay compound is loaded into the mold box 30 and firmly packed. Then the cover plate 31 is placed on top of the mold box 30 and push plate 44 is pressed toward end plate 39 by a hydraulic press or the like, until push plate 44 comes in registry with the back side of end plate 39. At that point, the extruded vermiculite and clay compound will have been completely ejected from the mold box 30. The facing layer 11 can be separately extruded then added to the molded insulating layer 12 or the facing layer material can be placed on top of the insulative layer material in the mold box 30 and both extruded simultaneously. In either case, the extruded material must be sliced into the appropriate brick sizes after leaving the mold 30.

Having thus described the preferred embodiment of the invention, it should be understood that numerous structural modifications and adaptations may be resorted to without departing from the spirit of the invention.

What is claimed is:

1. A method for forming insulated brick intended solely for use in building walls and having superior insulation qualities and lighter weight consonant with the load bearing capabilities of building bricks and the appearance of facing bricks, the method comprising the steps of:

dry mixing two parts of vermiculite and one part of brick clay, thereby forming a dry mixture having a vermiculite to clay ratio of approximately two-to-one by volume;

adding water to the dry mixture and mixing, so that a substantially dry admixture having expanded vermiculite and brick clay is formed;

forming a facing layer solely from brick clay;

molding and compressing the substantially dry admixture, so as to form a generally rectangular main body layer having parallel top and bottom faces, a pair of parallel side faces and a pair of parallel end faces, respectively, the top and bottom faces being substantially larger in area than the respective side faces, and the side faces being substantially larger in area than the respective end faces, the body layer further having at least one bore formed therein, the bore running from the top face to the bottom face perpendicularly thereto and substantially parallel to the side surfaces thereof, the bore being substantially centrally disposed and wherein the facing layer is disposed on one of the side surfaces of the body portion;

curing the molded admixture having the facing layer disposed thereon; whereby a cured brick is formed; and firing the cured brick and the facing layer disposed thereon, whereby an integral brick is formed having top and bottom faces of the brick which are entirely devoid of facing layers, wherein the brick has the desired load bearing capability substantially between its top and bottom faces, whereby the outer facing layer only provides the desired appearance and weather resistance, and further whereby the weight of the brick is substantially reduced and the insulation value of the brick is substantially increased over conventional building bricks.

* * * * *